(12) United States Patent
Teruzzi et al.

(10) Patent No.: US 12,385,534 B2
(45) Date of Patent: Aug. 12, 2025

(54) CALIPER BODY AND BRAKE CALIPER WITH SAID BODY

(71) Applicant: BREMBO S.p.A., Curno (IT)

(72) Inventors: Andrea Teruzzi, Curno (IT);
Gianfranco Dell'acqua, Curno (IT);
Giovanni Fattori, Curno (IT)

(73) Assignee: Brembo S.p.A., Bergamo (IT)

( * ) Notice: Subject to any disclaimer, the term of this patent is extended or adjusted under 35 U.S.C. 154(b) by 431 days.

(21) Appl. No.: 18/004,205

(22) PCT Filed: Jul. 2, 2021

(86) PCT No.: PCT/IB2021/055959
§ 371 (c)(1),
(2) Date: Jan. 4, 2023

(87) PCT Pub. No.: WO2022/009046
PCT Pub. Date: Jan. 13, 2022

(65) Prior Publication Data
US 2023/0341015 A1 Oct. 26, 2023

(30) Foreign Application Priority Data
Jul. 7, 2020 (IT) .................... 102020000016357

(51) Int. Cl.
*F16D 65/02* (2006.01)
*F16D 55/228* (2006.01)
(Continued)

(52) U.S. Cl.
CPC ....... *F16D 65/0068* (2013.01); *F16D 55/228* (2013.01); *F16D 2055/0016* (2013.01)

(58) Field of Classification Search
CPC ............... F16D 65/0068; F16D 55/228; F16D 2055/0016
(Continued)

(56) References Cited

U.S. PATENT DOCUMENTS 3,183,999 A 5/1965 Buyze et al.
6,708,802 B2 3/2004 Stahl et al.
(Continued)

FOREIGN PATENT DOCUMENTS

DE 102008029582 A1 4/2009
EP 1534974 B1 3/2007
(Continued)

OTHER PUBLICATIONS

European Patent Office, International Search Report, issued in PCT/IB2021/055959, Sep. 24, 2021, Rijswijk, NL.

*Primary Examiner* — Christopher P Schwartz
(74) *Attorney, Agent, or Firm* — Marshall & Melhorn, LLC (57) ABSTRACT

A caliper body has a first elongated vehicle-side element, a second elongated wheel-side element, a central caliper bridge connecting the first elongated vehicle-side element to the second elongated wheel-side element and having a first bridge end portion, a central bridge portion extending between the first elongated vehicle-side element and the second elongated wheel-side element, and a second bridge end portion. The first and second bridge end portions respectively connect the central bridge portion to the first elongated vehicle-side element and the second elongated wheel-side element. The central caliper bridge has a pair of bridge ribs forming a trench therebetween and extending seamlessly running along the first bridge end portion, forming a pair of first end rib portions, the central bridge portion, forming a pair of central rib portions, and the second bridge end portion, forming a pair of second end rib portions. The first and second end rib portions respectively form a pair of first and second end elbows.

24 Claims, 8 Drawing Sheets

(51) Int. Cl.
*F16D 65/00* (2006.01)
*F16D 55/00* (2006.01)

(58) Field of Classification Search
USPC .......................................... 188/73.39, 73.47
See application file for complete search history.

(56) References Cited

U.S. PATENT DOCUMENTS

| | | | |
|---|---|---|---|
| 10,539,199 B2* | 1/2020 | Wilson | F16D 55/228 |
| 2014/0158483 A1* | 6/2014 | Miyahara | F16D 65/0068 |
| | | | 188/73.47 |
| 2018/0209495 A1 | 7/2018 | Wilson et al. | |
| 2019/0316641 A1* | 10/2019 | Morio | F16D 55/228 |
| 2020/0408266 A1* | 12/2020 | Morio | F16D 65/0075 |
| 2021/0277969 A1* | 9/2021 | Rossi | F16D 55/228 |

FOREIGN PATENT DOCUMENTS

| | | |
|---|---|---|
| EP | 1911989 A1 | 4/2008 |
| EP | 2022999 A1 | 2/2009 |
| EP | 3553339 A1 | 10/2019 |
| JP | H09257063 A | 9/1997 |
| WO | 2019049801 A1 | 3/2019 |
| WO | 2019244004 A1 | 12/2019 |

* cited by examiner

CALIPER BODY AND BRAKE CALIPER WITH SAID BODY

CROSS-REFERENCE TO RELATED APPLICATIONS

This application is a National Phase Application of PCT International Application No. PCT/IB2021/055959, having an International Filing Date of Jul. 2, 2021 which claims priority to Italian Application No. 102020000016357 filed Jul. 7, 2020, each of which is hereby incorporated by reference in its entirety.

FIELD OF THE INVENTION

The present invention relates to a caliper body for a disc brake, e.g., for a motor vehicle, and to a disc brake caliper which comprises such a body.

In accordance with an embodiment, the present invention relates to a fixed caliper body, i.e., with opposite thrust devices which act on opposite brake pads acting on opposite braking surfaces of a disc brake disc.

Hereafter, the disc brake assembly will be described with reference to the rotation axis of the disc, indicated by reference A-A, which defines an axial direction X-X. Axial direction means any direction X-X directed parallel to the rotation axis A-A of the brake disc. Additionally, radial direction R-R means all directions orthogonal to the rotation axis A-A and incident therewith. Furthermore, circumferential direction C-C means that circumference orthogonal to the axial direction A-A and the radial directions R-R.

Otherwise, tangential direction T-T means a direction which is duly orthogonal to an axial direction X-X and a radial direction R-R and tangent to a circumferential direction C-C passing through such a point.

BACKGROUND ART

In a disc brake, the brake caliper is arranged straddling the outer peripheral margin of a brake disc. The brake caliper usually comprises a body having two elongated elements which are arranged so as to face opposite braking surfaces of a disc. Clutch pads are provided arranged between each elongated element of the caliper and the braking surfaces of the brake disc. At least one of the elongated elements of the caliper body has cylinders adapted to accommodate hydraulic pistons capable of applying a thrust action to the pads, abutting them against the braking surfaces of the disc to apply the braking action to the vehicle.

Brake calipers are usually constrained to a supporting structure which remains stationary to the vehicle, such as a stub axle of a vehicle suspension, for example.

In a typical arrangement, one of the two elongated elements has two or more attachment portions of the body of the caliper to the supporting structure, for example by providing slots or eyelets, e.g., arranged axially, or holes, e.g., arranged radially, adapted to receive screws for fixing the caliper, which are accommodated with the ends thereof in threaded holes provided on the caliper support.

In a typical caliper body construction, the elongated elements arranged facing the braking surfaces of the disc are connected together by bridge-like elements arranged straddling the disc.

A caliper body of this type is described in EP-A-2022999. FIG. 1 of EP-A-2022999 shows a caliper body of the fixed caliper type. This caliper body is of the monolithic type comprising two elongated elements, the ends of which are mutually connected by bridges. Stiffening rods extend between the elongated elements and between the two bridges, thus forming a cross-shaped structure.

The caliper comprises several different components mounted to the body, such as pistons, seals, bleed devices and brake fluid feeding pipes.

Typically, the caliper body is made of metal, such as aluminum or aluminum alloy or cast iron. The body of the caliper can be obtained by casting, but also by mechanical stock removal machining, as well as forging.

The caliper body can be made either in one piece or a single piece or to be monolithic, but also in the form of two semi-calipers typically connected to each other along a plane which usually coincides with the median plane of the disc on which the caliper is arranged straddling.

Desiring to stop or decelerate the vehicle, the driver applies a force to the brake pedal, in the case of a motor vehicle. Such a force on the brake pedal applies, through a brake master cylinder, a brake fluid pressure which, through a pipe, is applied to the brake fluid present in the hydraulic circuit placed inside the caliper body to reach the cylinders where the pressure is applied to the bottom surface of the pistons, thus forcing them to be closed against the pads, which in turn abut against the braking surfaces of the disc.

The pressure action of the brake fluid is also applied to the bottom wall of the cylinder, thus causing a reaction in the caliper body which deforms it away from the disc surfaces. This deformation of the caliper body leads to an increase in the piston stroke, and thus to an increase in brake pedal stroke.

The caliper body also deforms as a function of the torque applied by the action of the pistons which, by abutting the pads against the braking surfaces of the disc, apply a deformation moment in directions which form torque arms with respect to the fixing points of the cover body to the support thereof. These torques also deform the caliper body in a tangential and radial direction with respect to the disc, as well as in an axial direction.

Therefore, the caliper body must have sufficient structural rigidity so as to ensure that this deformation of the caliper body caused by the braking action is maintained within acceptable values, which in addition to avoiding damage to the brake system do not create the feeling of a yielding braking system to the driver, thus resulting in an extra travel of the lever or pedal of the braking system and creating a system feeling that sports car drivers call "spongy". This need urges having highly rigid structures for the bodies of the calipers and thus increasing the size and weight thereof.

On the other hand, since the caliper body is constrained to the vehicle suspension and arranged straddling the disc, it is one of the unsprung weights intended to be reduced as much as possible in order to increase vehicle performance.

Obviously, these considerations are taken to the extreme when the vehicle is of the racing type and the user desires a braking system which is highly responsive to commands while being highly lightweight in order not to penalize the racing vehicle performance.

The need is thus felt for a disc brake caliper body which has improved structural features, the weight of the caliper body being the same, or has equal structural features, the weight being lower than the solutions of the prior art.

Solutions of caliper bodies especially designed to increase the structural rigidity features are known. For example, the aforementioned patent application EP-A-2022999, patent application EP-A-1534974, U.S. patent U.S. Pat. No. 6,708,802, European patent application EP-A-1911989, Japanese patent application JP-A-09257063 and U.S. patent U.S. Pat.

No. 3,183,999, as well as DE102008029582 all suggest solutions of brake caliper bodies equipped with reinforcing elements, e.g., placed about the caliper bodies. In some of these well-known solutions, the caliper body is symmetrical according to planes passing through the disc axis or through the disc middle line. In other solutions, the caliper body has large, distributed windows, which may also be through-windows, which form elongated reinforcing elements arranged longitudinally to the caliper body.

Although these known solutions are satisfactory from many points of view, they still do not allow to obtain structures which maximize the structural rigidity of the caliper body, thus reducing weight while being capable of minimizing the dimensions as much as possible to facilitate the assembly of the caliper body even inside rims and wheels to which brake discs of large diameter are mounted.

Furthermore, the need is strongly felt to create large openings in the caliper body which allow an exchange of hot air generated close to the braking surfaces due to the friction applied thereto by the brake pads. Obviously, this need is also at odds with that of having a caliper which is rigid and not very deformable upon the braking action.

Solution

These and other objects are achieved by a caliper body and a brake caliper as described and claimed herein.

Some advantageous embodiments are the subject of the dependent claims.

The analysis of this solution showed that the suggested solution also allows to optimize the deformation of the caliper in use. In particular, by virtue of the suggested solution, it is possible to have a great braking action even with limited maximum brake disc diameters while having a lightweight caliper body and a rigid caliper body with limited deformations or distortions generated by the braking action, as well as greater ease in adjusting the braking action and greater braking action accuracy.

By virtue of the suggested solutions, it is possible to obtain a lighter caliper with greater rigidity but at the same time large ventilation windows which allow easier cooling of the braking system.

FIGURES

Further features and advantages of the invention will become apparent from the description provided below of preferred embodiments thereof, given by way of non-limiting examples, with reference to the accompanying drawings, in which.

DESCRIPTION OF SOME PREFERRED EMBODIMENTS

Figure 1:
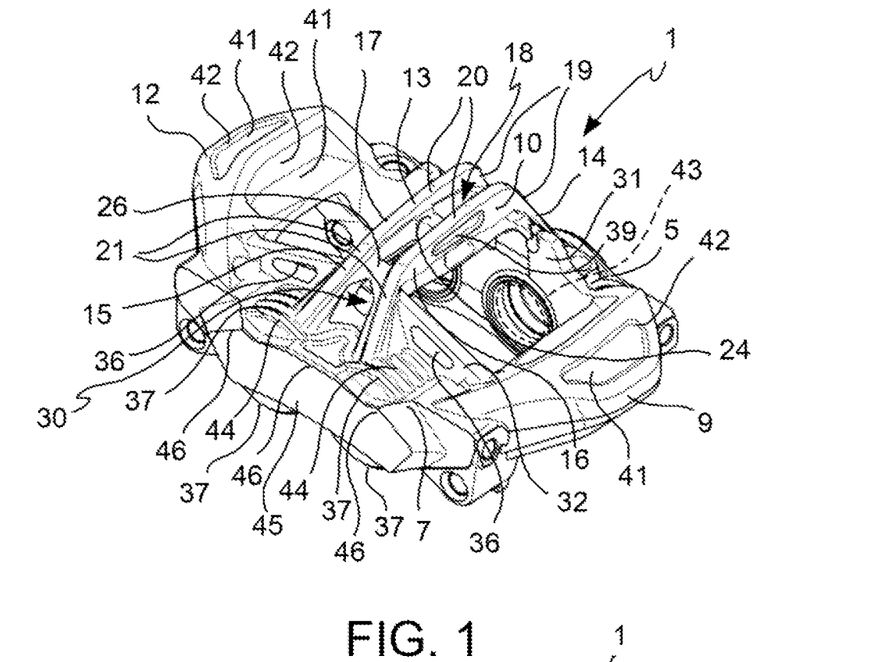
FIG. 1 shows a wheel-side axonometric view of a caliper body according to the invention.
Figure 2:
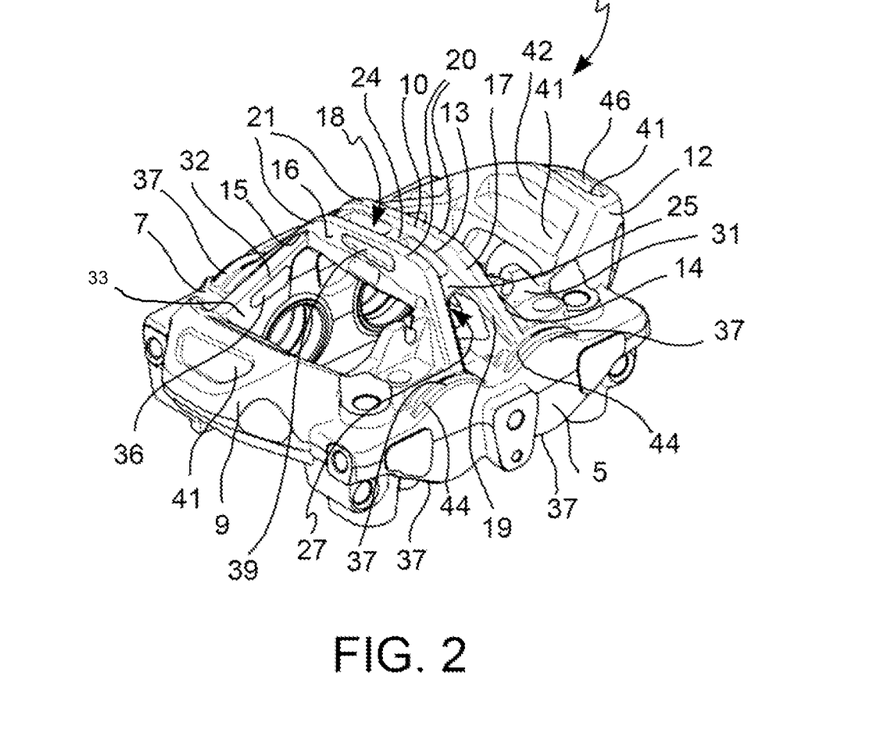
FIG. 2 shows a vehicle-side axonometric view of the caliper body in FIG. 1.
Figure 3:
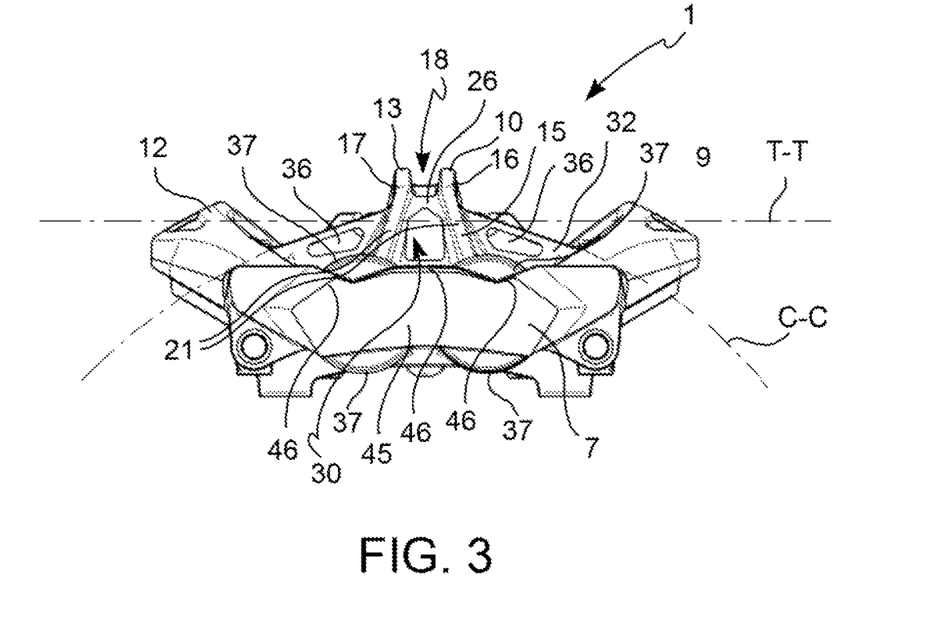
FIG. 3 shows a front wheel-side axonometric view of the caliper body in FIG. 1.
Figure 4:
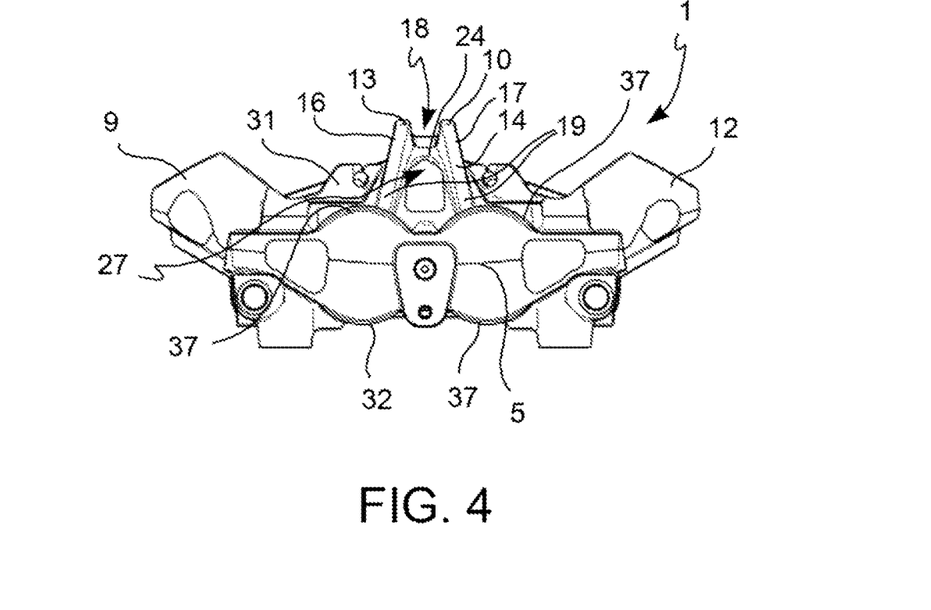
FIG. 4 shows a rear or vehicle-side view of the caliper body in FIG. 1.
Figure 5:
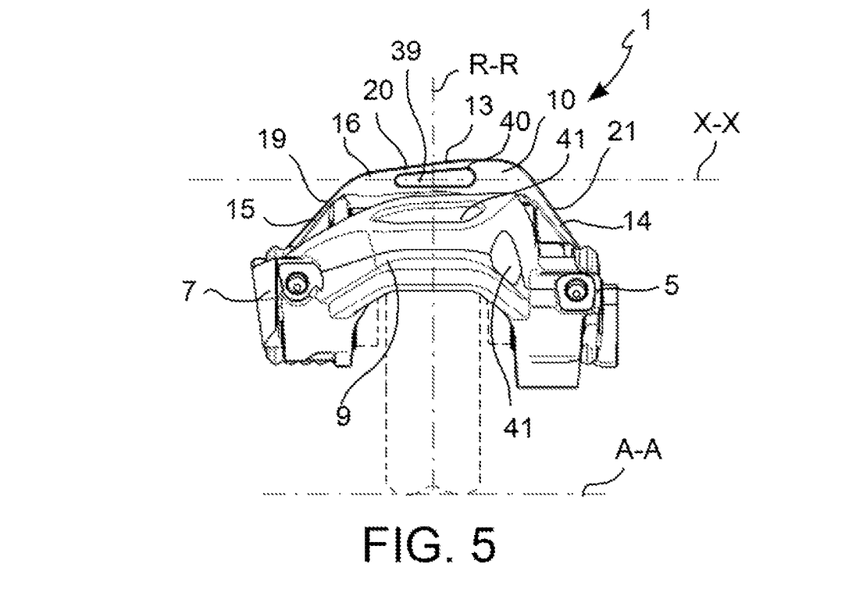
FIG. 5 and FIG. 6 are side views of the caliper in FIG. 1.
Figure 6:
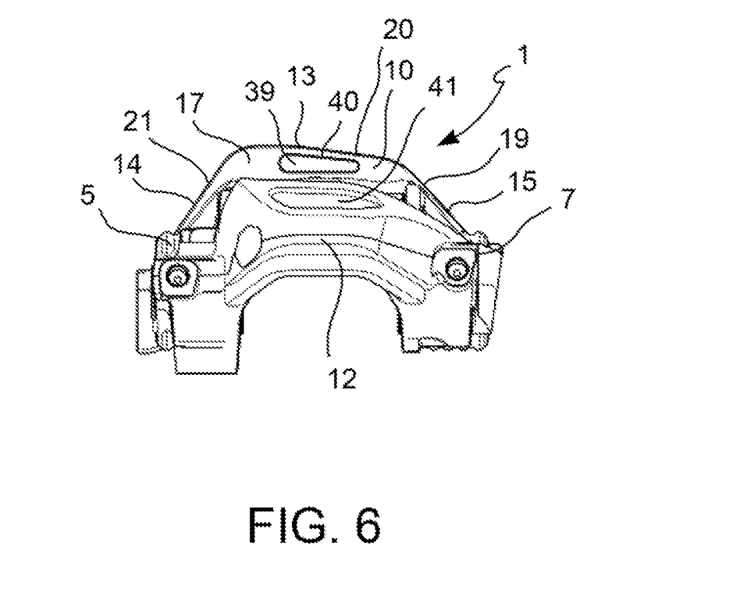
Figure 7:
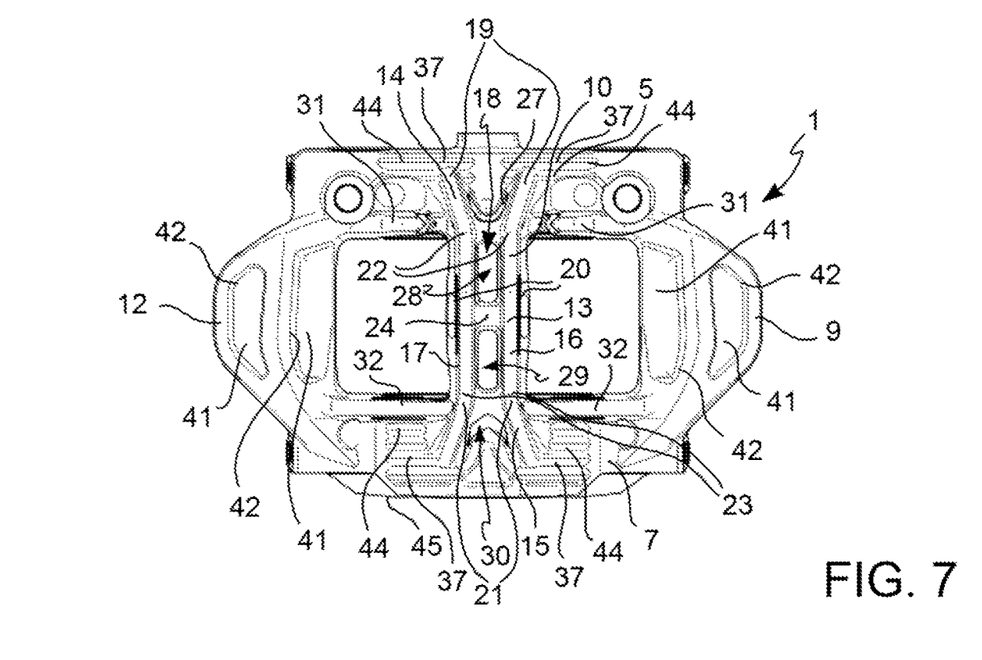
FIG. 7 shows a top or radially outer view of the caliper body in FIG. 1.
Figure 8:
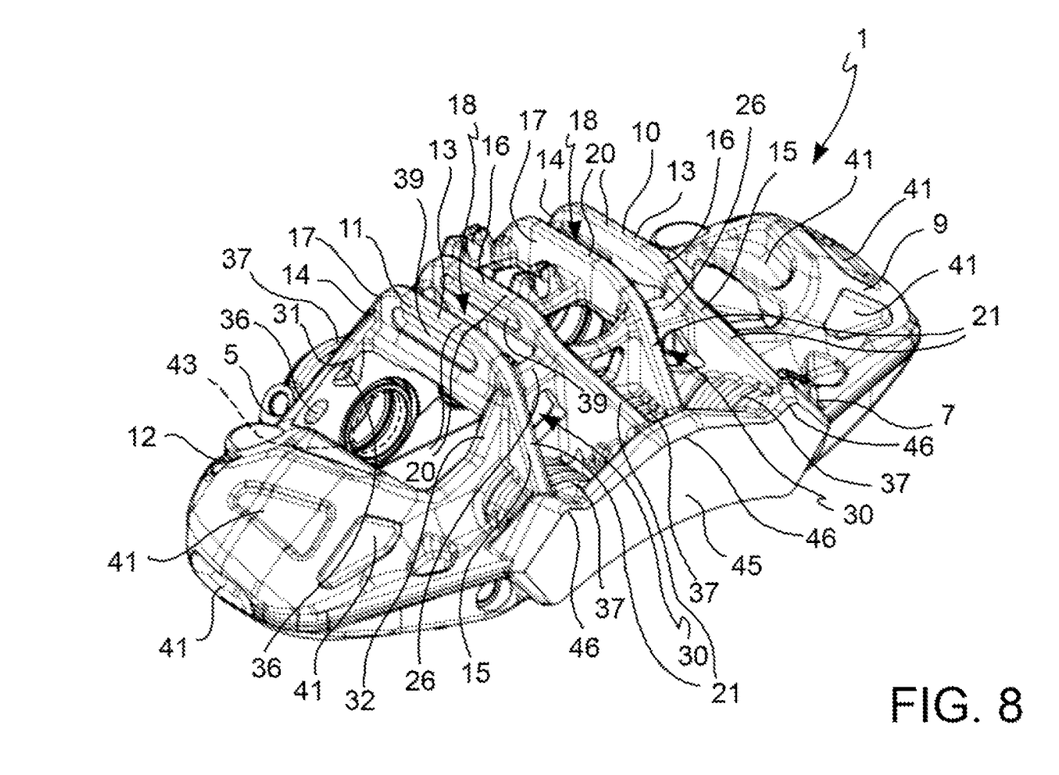
FIG. 8 shows a wheel-side axonometric view of a brake caliper according to a further embodiment.
Figure 9:
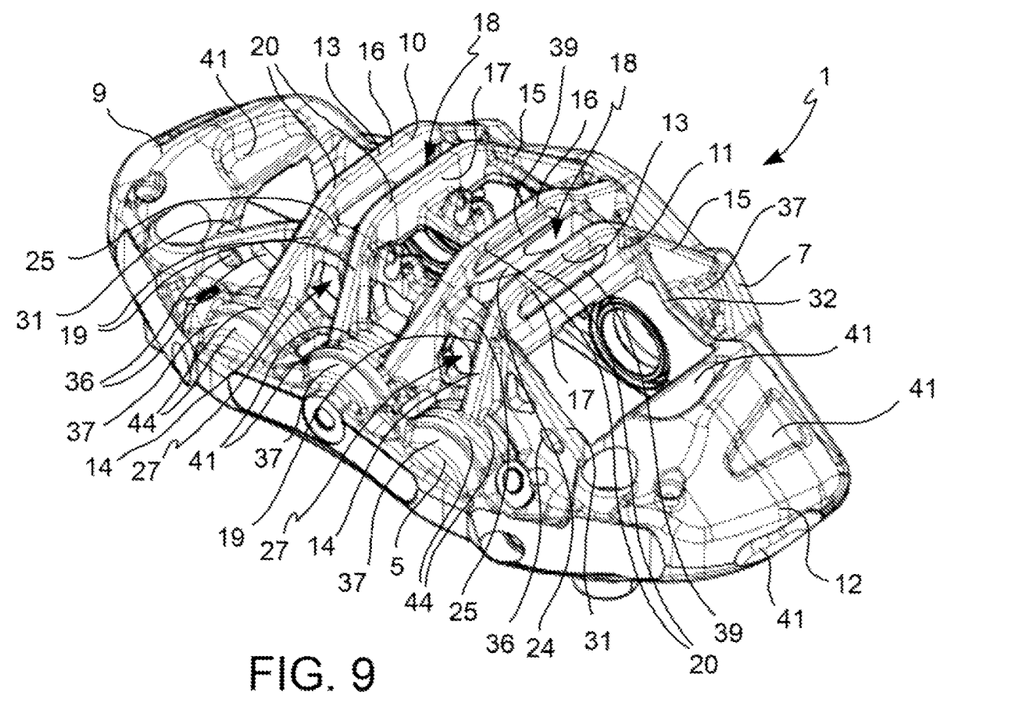
FIG. 9 shows a vehicle-side axonometric view of the caliper body in FIG. 8.
Figure 10:
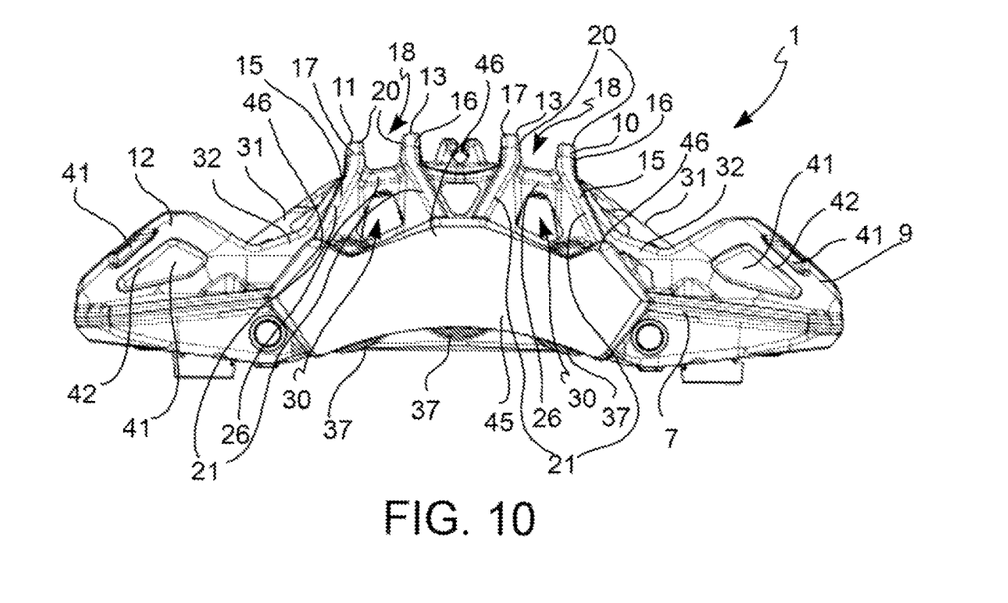
FIGS. 10 to 14 show the orthogonal views (front, back, right, left, top) of the caliper body in FIG. 8.
Figure 11:
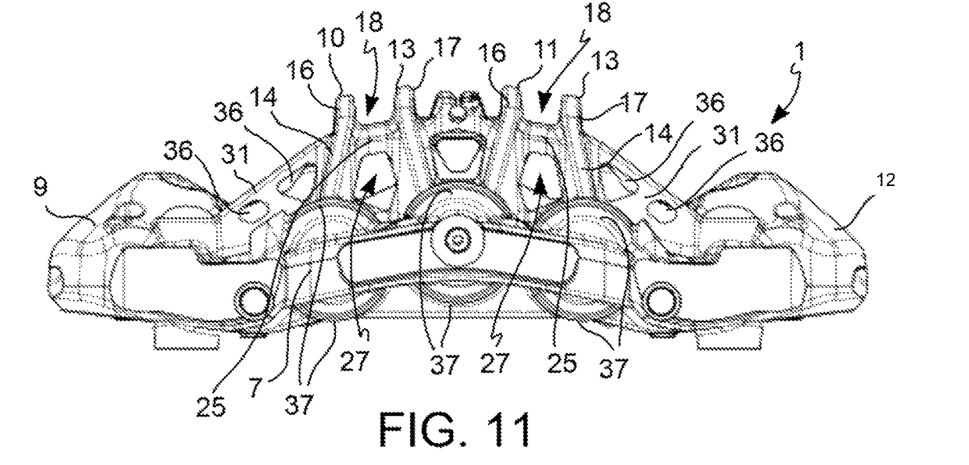
Figure 12:
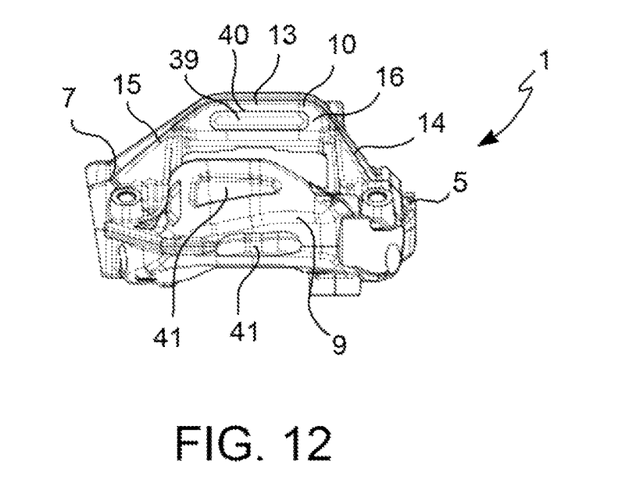
Figure 13:
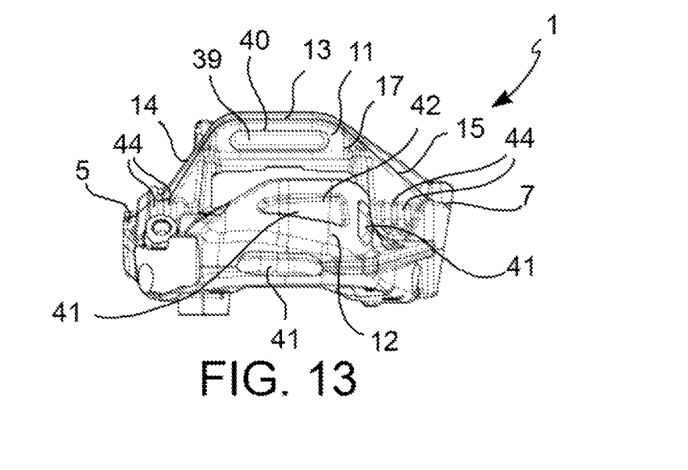
Figure 14:
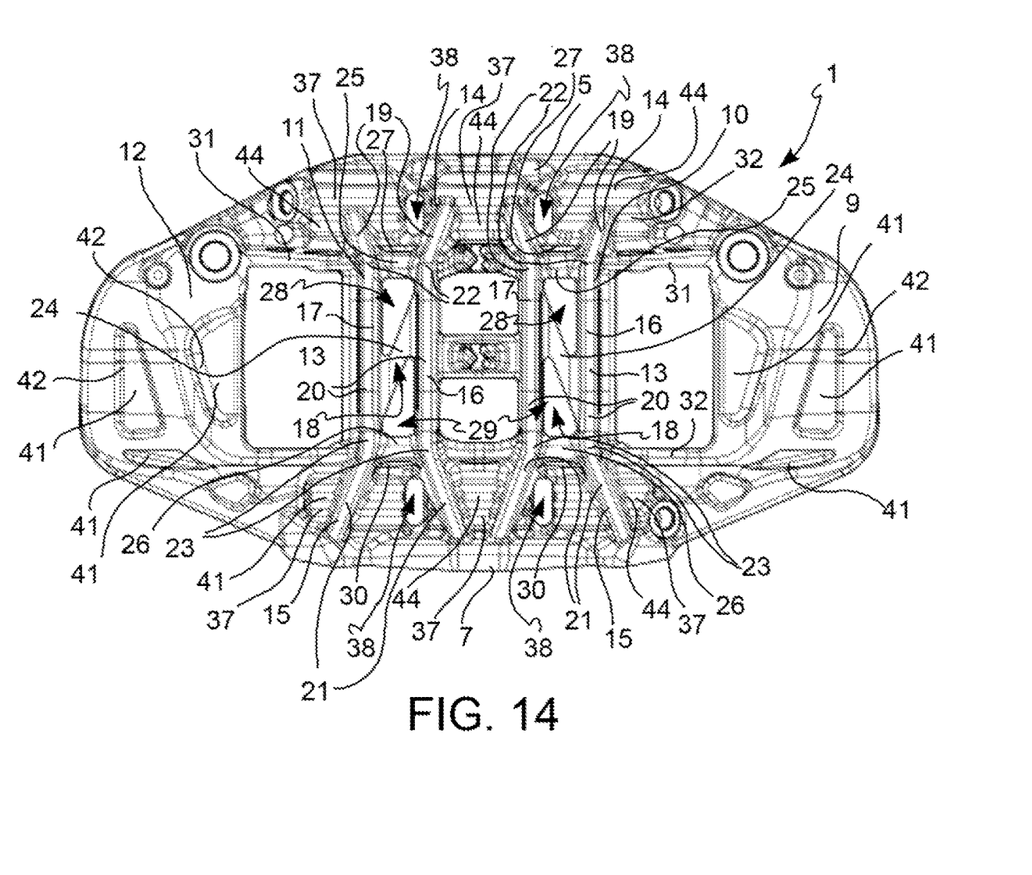
Figure 15:
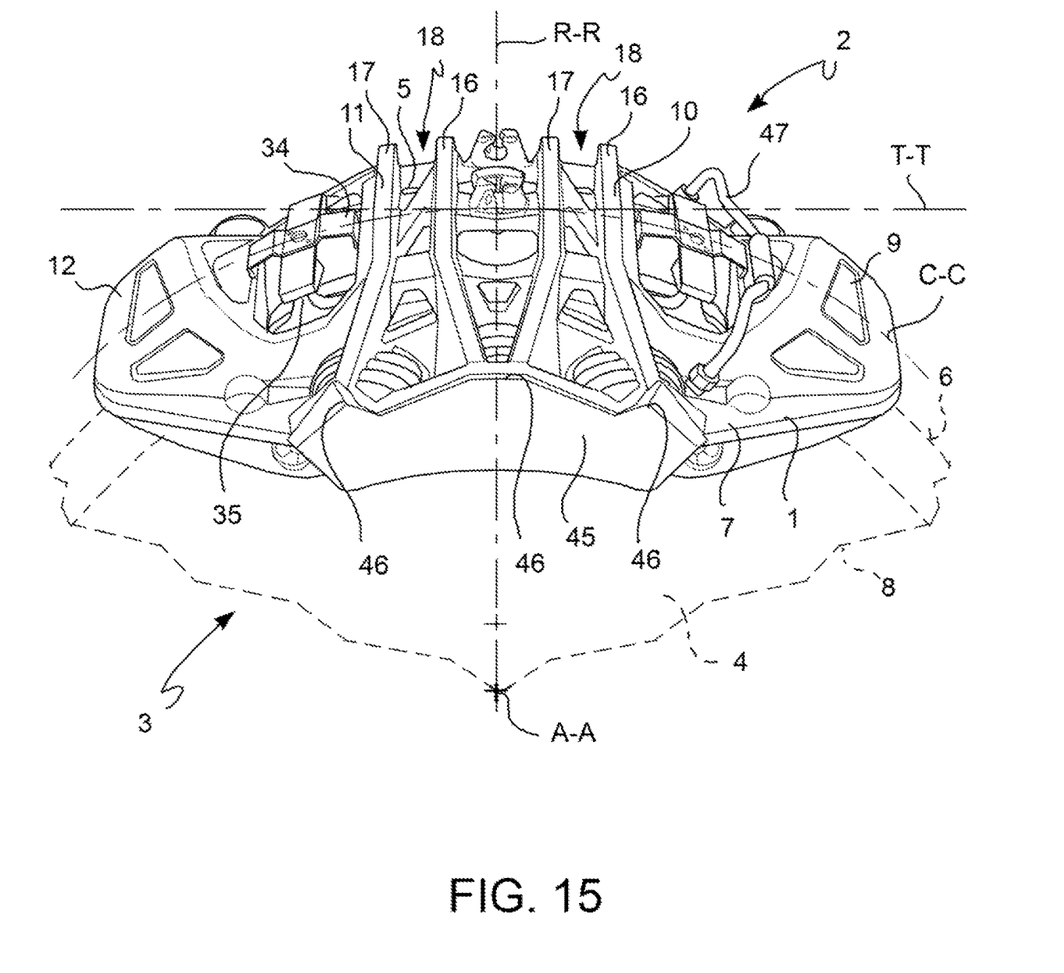
FIG. 15 shows a caliper according to an embodiment comprising a caliper body according to FIG. 8.

In accordance with a general embodiment, a caliper body 1 for brake caliper 2 of disc brake 3 is adapted to be arranged straddling the outer peripheral margin of a disc brake 4. Said disc brake 4 is adapted to rotate about a rotation axis A-A defining an axial direction X-X, a radial direction R-R, substantially orthogonal to said axial direction X-X, and a circumferential direction C-C, orthogonal to both said axial direction X-X and said radial direction R-R, a tangential direction T-T passing through an intersection point between said radial R-R, circumferential C-C, and axial X-X directions defining a tangent to said circumferential direction C-C, arranged orthogonally to both said axial direction X-X and said radial direction R-R.

Said caliper body 1 comprises a first elongated vehicle-side element 5 adapted to face a first braking surface 6 of the brake disc 4.

Said caliper body 1 comprises a second elongated wheel-side element 7 adapted to face a second braking surface 8 of the brake disc 4 opposite to said first braking surface 6.

Said caliper body 1 comprises at least one central caliper bridge 10, 11 which connects said first elongated vehicle-side element 5 to said second elongated wheel-side element 7. Said at least one caliper bridge 10, 11 is arranged straddling said brake disc 4.

Said at least one central caliper bridge 10, 11 comprises a first bridge end portion 14, a central bridge portion 13, and a second bridge end portion 15.

Said central caliper bridge 13 extends between said elongated vehicle-side element 5 and said elongated wheel-side element 7.

Said central bridge portion 13 mainly extends in the axial direction X-X.

Said first bridge end portion 14 connects said central bridge portion 13 to said elongated vehicle-side element 5.

Said second bridge end portion 15 connects said central bridge portion 13 to said elongated wheel-side element 7.

Advantageously, said at least one central caliper bridge 10, 11 comprises at least one pair of bridge ribs 16, 17 which extend mutually side-by-side forming a trench 18 therebetween.

Said pair of bridge ribs 16, 17 extends seamlessly running along said first bridge end portion 14, forming a pair of first end rib portions 19, said central bridge portion 13, forming a pair of central rib portions 20, said second bridge end portion 15, forming a pair of second end rib portions 21.

Said pair of first end ribs 19 extend away from each other passing from said central bridge portion 13 to said elongated vehicle-side element 5.

Said pair of first end ribs 19, passing from said central bridge portion 13 to said elongated vehicle-side element 5, extend inclined away from said axial direction X-X and approaching and connecting to said elongated vehicle-side element 5, forming a pair of first end elbows 22 where they connect to said central bridge portion 13.

Said pair of second end ribs 21 extend away from each other passing from said central bridge portion 13 to said elongated wheel-side element 7.

Said pair of second end ribs 21, passing from said central bridge portion 13 to said elongated vehicle-side element 7, extend inclined away from said axial direction X-X and approaching and connecting to said elongated wheel-side element 7, forming a pair of second end elbows 23 where they connect to said central bridge portion 13.

In accordance with an embodiment, said at least one pair of bridge ribs 16, 17 which extend mutually side-by-side form a trench 18 which extends seamlessly therebetween.

In accordance with an embodiment, said pair of central ribs 20 are central ribs which mainly extend in the axial direction X-X remaining parallel to each other.

In accordance with an embodiment, said at least one central caliper bridge 10, 11 is a central caliper bridge made in one piece.

In accordance with an embodiment, said at least one central caliper bridge 10, 11 further comprises at least one reinforcing element 24, 25, 26 connecting said bridge ribs 16, 17 of said at least one pair of bridge ribs 16, 17.

In accordance with an embodiment, said at least one reinforcing element 24, 25, 26 is a central reinforcing element 24, a first elbow reinforcing element 25, and a second elbow reinforcing element 26.

In accordance with an embodiment, said bridge ribs 16, 17 and said reinforcing elements 24, 25, 26 delimit bridge through-windows 27, 28, 29, 30.

In accordance with an embodiment, said at least one reinforcing element 24, 25, 26 locally forms a bottom wall of said trench 18.

In accordance with an embodiment, said at least one reinforcing element 24 is a central reinforcing element 24 and connects said pair of central ribs 20.

In accordance with an embodiment, said central reinforcing element 24 extends in the tangential T-T or circumferential C-C direction.

In accordance with an embodiment, central reinforcing element 24 extends inclined with respect to said tangential T-T and axial X-X directions.

In accordance with an embodiment, said caliper body 1 further comprises at least one circumferential rib 31, 32.

In accordance with an embodiment, said at least one circumferential rib 31, 32 is a circumferential vehicle-side rib 31 and a circumferential wheel-side rib 32.

In accordance with an embodiment, said at least one circumferential rib 31, 32 connects said pair of first or second end elbows 22, 23 of said pair of bridge ribs 16, 17.

In accordance with an embodiment, said at least one circumferential rib 31, 32 extends away from said pair of bridge ribs 16, 17.

In accordance with an embodiment, said caliper body 1 comprises a central opening or brake pad housing pocket 33 adapted to house brake pads 34, 35.

In accordance with an embodiment, said at least one circumferential rib 31, 32 delimits said central opening 33.

In accordance with an embodiment, said at least one circumferential rib 31, 32 comprises at least one circumferential rib through-window 36.

In accordance with an embodiment, said pair of first and second end ribs 19 and 21 connect to the elongated vehicle-side and wheel-side elements 5, 7 in portions thereof which delimit at least one thrust or cylinder means seat 37.

In accordance with an embodiment, at least one radial through-window 38 is provided between said pair of first and second end ribs 19 and 21.

In accordance with an embodiment, at least one of said bridge ribs 16, 17 has at least one lowered rib portion 39 which forms at least one recess which reduces the thickness of the body of said at least one of said bridge ribs 16, 17.

In accordance with an embodiment, the lowered rib portion 39 is a lowered area entirely surrounded by a rib edge 40.

In accordance with an embodiment, said caliper body 1 comprises end bridges 9, 12.

In accordance with an embodiment, at least one of said end bridges 9, 12 comprises at least one lowered bridge portion 41 forming at least one recess which reduces the thickness of the body of said at least one of said end bridges 9, 12.

In accordance with an embodiment, the lowered bridge portion 41 is a lowered area entirely surrounded by a bridge edge 42.

In accordance with an embodiment, said caliper body 1 is a monolithic caliper body.

In accordance with an embodiment, said caliper body 1 is a caliper body made in one piece.

In accordance with an embodiment, said first elongated vehicle-side element 5, said second elongated wheel-side element 7, and said at least one caliper bridge 9, 10, 11, 12 are made in one piece.

In accordance with an embodiment, each of said elongated vehicle-side and wheel-side elements 5, 7 comprises at least one portion which delimits at least one thrust or cylinder means seat 37 to receive at least one thrust device 43 adapted to bias at least one brake pad 34, 35 against said braking surfaces 6, 8 to apply a braking action to a vehicle.

In accordance with an embodiment, at least one portion which delimits at least one thrust or cylinder means seat 37 has a cylindrical shape protruding both above and below said elongated element 5 and/or 7 and cylinder ribs 44.

In accordance with an embodiment, said cylinder ribs 44 are arc-shaped ribs.

In accordance with an embodiment, said cylinder ribs 44 are a plurality of ribs arranged parallel to one another.

In accordance with an embodiment, said caliper body 1 comprises a shield 45 connected to the bottom of said at least one thrust or cylinder means seat 37.

In accordance with an embodiment, said shield 45 comprises three shield protrusions 46 projecting in radial direction R-R.

In accordance with an embodiment, said shield 45 tapers away from said thrust or cylinder means seat 37.

In accordance with an embodiment, said caliper body 1 comprises two end bridges 9, 12 and a central bridge 10 having a pair of bridge ribs 16, 17.

In accordance with an embodiment, said caliper body 1 comprises two end bridges 9, 12 and two central bridges 10, 11 each having a pair of bridge ribs 16, 17.

The present invention further relates to a brake caliper 2 comprising a caliper body 1 as described in any one of the preceding embodiments.

In accordance with an embodiment, said brake caliper 2 comprises a fluid connection line 47 connected to said elongated elements 5, 7 and arranged between at least one central bridge 10 or 11 and an end bridge 9, 12.

In order to meet contingent needs, those skilled in the art may make many changes and adaptations to the embodiments described above or may replace elements with others which are functionally equivalent, without however departing from the scope of the appended claims.

LIST OF REFERENCE SIGNS 1 caliper body
2 brake caliper
3 disc brake
4 brake disc
5 elongated vehicle-side element
6 vehicle-side brake disc braking surface 7 elongated wheel-side element
8 wheel-side brake disc braking surface
9 end caliper bridge or end bridge
10 central bridge
11 central bridge
12 end bridge
13 central bridge portion
14 first bridge end portion
15 second bridge end portion
16 bridge rib or rib
17 bridge rib or rib
18 trench placed between the bridge ribs
19 first end rib portion pair or first end rib pair
20 central rib portion part or central rib pair
21 second end rib portion pair or second end rib pair
22 first end elbow pair
23 second end elbow pair
24 central reinforcing element
25 elbow reinforcing element
26 elbow reinforcing element
27 bridge through-window
28 bridge through-window
29 bridge through-window
30 bridge through-window
31 circumferential vehicle-side rib
32 circumferential wheel-side rib
33 central opening or brake pad housing pocket
34 brake pad
35 brake pad
36 circumferential rib through-window
37 portion which delimits at least one seat for thrust or cylinder means
38 radial through-window
39 lowered rib portion
40 rib edge
41 lowered bridge portion
42 bridge edge
43 thrust device
44 cylinder ribs
45 shield
46 shield protrusion
47 fluid connection line
A-A rotation axis of the brake disc
X-X axial direction parallel to rotation axis
R-R radial direction orthogonal to rotation axis
C-C circumferential direction orthogonal to axial direction and radial directions
T-T tangential direction duly orthogonal to a radial direction and an axial direction

The invention claimed is:

1. A caliper body for a brake caliper of a disc brake adapted to be arranged straddling an outer peripheral margin of a brake disc, adapted to rotate about a rotation axis defining an axial direction, a radial direction substantially orthogonal to said axial direction, and a circumferential direction orthogonal to both said axial direction and said radial direction, a tangential direction passing through an intersection point between said radial, circumferential, and axial directions defining a tangent to said circumferential direction, arranged orthogonal to both said axial direction and said radial direction;

said caliper body comprising:
a first elongated vehicle-side element adapted to face a first braking surface of the brake disc;
a second elongated wheel-side element adapted to face a second braking surface of the brake disc, opposite to said first braking surface;
at least one central caliper bridge that connects said first elongated vehicle-side element to said second elongated wheel-side element; said at least one central caliper bridge being arranged straddling said brake disc;
said at least one central caliper bridge comprising a first bridge end portion, a central bridge portion, and a second bridge end portion; wherein
said central bridge portion extends between said first elongated vehicle-side element and said second elongated wheel-side element;
said central bridge portion mainly extends in the axial direction;
said first bridge end portion connects said central bridge portion to said first elongated vehicle-side element;
said second bridge end portion connects said central bridge portion to said second elongated wheel-side element;
wherein
said at least one central caliper bridge comprises at least one pair of bridge ribs extending mutually side-by-side forming a trench therebetween;
said at least one pair of bridge ribs extends seamlessly running along said first bridge end portion, forming a pair of first end rib portions, said central bridge portion, forming a pair of central rib portions, said second bridge end portion, forming a pair of second end rib portions;
said pair of first end rib portions extend away from each other passing from said central bridge portion to said first elongated vehicle-side element;
said pair of first end rib portions, passing from said central bridge portion to said first elongated vehicle-side element, extend inclined away from said axial direction and approaching and connecting to said first elongated vehicle-side element, forming a pair of first end elbows where they connect to said central bridge portion;
said pair of second end rib portions extend away from each other passing from said central bridge portion to said second elongated wheel-side element;
said pair of second end rib portions, passing from said central bridge portion to said second elongated wheel-side element, extend inclined away from said axial direction and approaching and connecting to said second elongated wheel-side element, forming a pair of second end elbows where they connect to said central bridge portion.

2. The caliper body of claim 1, wherein said at least one central caliper bridge further comprises at least one reinforcing element connecting the bridge ribs of said at least one pair of bridge ribs.

3. The caliper body of claim 2, wherein said at least one reinforcing element is a central reinforcing element and connects said pair of central rib portions.

4. The caliper body of claim 3, wherein
said central reinforcing element extends in the tangential direction or the circumferential direction;
and/or wherein
said central reinforcing element extends inclined with respect to said tangential and axial directions.

5. The caliper body of claim 2, wherein said at least one reinforcing element is a central reinforcing element, a first elbow reinforcing element, and a second elbow reinforcing element.

6. The caliper body of claim 2, wherein said bridge ribs and said at least one reinforcing element delimit bridge through-windows.

7. The caliper body of claim 2, wherein said at least one reinforcing element locally forms a bottom wall of said trench.

8. The caliper body of claim 1, wherein
said caliper body further comprises at least one circumferential rib;
or wherein
said caliper body further comprises at least one circumferential rib, and wherein
said at least one circumferential rib is a circumferential vehicle-side rib and a circumferential wheel-side rib;
and/or wherein
said caliper body further comprises at least one circumferential rib, and wherein
said at least one circumferential rib connects said pair of first end elbows or said pair of second end elbows;
and/or wherein
said at least one circumferential rib extends away from said at least one pair of bridge ribs.

9. The caliper body of claim 8, wherein said caliper body comprises a central opening adapted to house brake pads, and wherein said at least one circumferential rib delimits said central opening.

10. The caliper body of claim 8, wherein said at least one circumferential rib comprises at least one circumferential rib through-window.

11. The caliper body of claim 1, wherein
said pair of first end rib portions and said pair of second end rib portions connect to the first elongated vehicle-side element and the second elongated wheel-side element in portions thereof that delimit at least one thrust or cylinder means seat;
and/or wherein
at least one radial through-window is provided between said pair of first end rib portions and said pair of second end rib portions.

12. The caliper body of claim 1, wherein each of said first elongated vehicle-side element and second elongated wheel-side element comprises at least one portion that delimits at least one thrust or cylinder means seat to receive at least one thrust device adapted to bias at least one brake pad against said first and second braking surfaces to apply a braking action to a vehicle.

13. The caliper body of claim 12, wherein
the at least one portion that delimits the at least one thrust or cylinder means seat has a cylindrical shape protruding both above and below said first elongated vehicle-side element and/or second elongated wheel-side element and cylinder ribs protrude from said cylindrical shape;
and/or wherein
the at least one portion that delimits the at least one thrust or cylinder means seat has a cylindrical shape protruding both above and below said first elongated vehicle-side element and/or second elongated wheel-side element and cylinder ribs protrude from said cylindrical shape, and wherein
said cylinder ribs are arc-shaped ribs;
and/or wherein
the at least one portion that delimits the at least one thrust or cylinder means seat has a cylindrical shape protruding both above and below said first elongated vehicle-side element and/or second elongated wheel-side element and cylinder ribs protrude from said cylindrical shape; and
said cylinder ribs are a plurality of ribs arranged parallel to one another.

14. The caliper body of claim 12, wherein
said caliper body comprises a shield connected to a bottom of said at least one thrust or cylinder means seat, and wherein
said shield comprises three shield protrusions projecting in the radial direction;
and/or wherein
said caliper body comprises a shield connected to the bottom of said at least one thrust or cylinder means seat, and wherein
said shield tapers away from said thrust or cylinder means seat.

15. The caliper body of claim 1, wherein said at least one pair of bridge ribs extending mutually side-by-side form a trench that extends seamlessly therebetween.

16. The caliper body of claim 1, wherein said pair of central rib portions are central ribs that mainly extend in the axial direction remaining parallel to each other.

17. The caliper body of claim 1, wherein said at least one central caliper bridge is a central caliper bridge made in one piece.

18. The caliper body of claim 1, wherein
at least one of said bridge ribs comprises at least one lowered rib portion forming at least one recess that reduces thickness of the at least one of said bridge ribs;
and/or wherein
at least one of said bridge ribs comprises at least one lowered rib portion, and wherein
said at least one lowered rib portion is a lowered area entirely surrounded by a rib edge.

19. The caliper body of claim 1, wherein
said caliper body comprises end bridges, and wherein
at least one of said end bridges comprises at least one lowered bridge portion forming at least one recess that reduces thickness of the at least one of said end bridges;
and/or wherein
said caliper body comprises end bridges, wherein
at least one of said end bridges comprises at least one lowered bridge portion, and wherein
said lowered bridge portion is a lowered area entirely surrounded by a bridge edge.

20. The caliper body of claim 1, wherein
said caliper body is a monolithic caliper body;
or wherein
said caliper body is a caliper body made in one piece;
or wherein
said first elongated vehicle-side element, said second elongated wheel-side element, and at least one central caliper bridge or end bridge are made in one piece.

21. The caliper body of claim 1, wherein said caliper body comprises two end bridges and a central caliper bridge having a pair of bridge ribs.

22. The caliper body of claim 1, wherein said caliper body comprises two end bridges and two central caliper bridges each having a pair of bridge ribs.

23. A brake caliper comprising
a caliper body for a brake caliper of a disc brake adapted to be arranged straddling an outer peripheral margin of a brake disc, adapted to rotate about a rotation axis defining an axial direction, a radial direction substantially orthogonal to said axial direction, and a circumferential direction orthogonal to both said axial direction and said radial direction, a tangential direction passing through an intersection point between said radial, circumferential, and axial directions defining a tangent to said circumferential direction, arranged orthogonal to both said axial direction and said radial direction;

said caliper body comprising:

a first elongated vehicle-side element adapted to face a first braking surface of the brake disc;

a second elongated wheel-side element adapted to face a second braking surface of the brake disc, opposite to said first braking surface;

at least one central caliper bridge that connects said first elongated vehicle-side element to said second elongated wheel-side element; said at least one central caliper bridge being arranged straddling said brake disc;

said at least one central caliper bridge comprising a first bridge end portion, a central bridge portion, and a second bridge end portion; wherein said central bridge portion extends between said first elongated vehicle-side element and said second elongated wheel-side element;

said central bridge portion mainly extends in the axial direction;

said first bridge end portion connects said central bridge portion to said first elongated vehicle-side element;

said second bridge end portion connects said central bridge portion to said second elongated wheel-side element;

wherein said at least one central caliper bridge comprises at least one pair of bridge ribs extending mutually side by side forming a trench therebetween;

said at least one pair of bridge ribs extends seamlessly running along said first bridge end portion, forming a pair of first end rib portions, said central bridge portion, forming a pair of central rib portions, said second bridge end portion, forming a pair of second end rib portions;

said pair of first end rib portions extend away from each other passing from said central bridge portion to said first elongated vehicle-side element;

said pair of first end rib portions, passing from said central bridge portion to said first elongated vehicle-side element, extend inclined away from said axial direction and approaching and connecting to said first elongated vehicle-side element, forming a pair of first end elbows where they connect to said central bridge portion;

said pair of second end rib portions extend away from each other passing from said central bridge portion to said second elongated wheel-side element;

said pair of second end rib portions, passing from said central bridge portion to said second elongated wheel-side element, extend inclined away from said axial direction and approaching and connecting to said second elongated wheel-side element, forming a pair of second end elbows where they connect to said central bridge portion.

24. The brake caliper of claim 23, wherein said brake caliper comprises a fluid connection line connected to the first elongated vehicle-side element and the second elongated wheel-side element and arranged between the at least one central caliper bridge and an end bridge.

* * * * *